3,399,217
CATALYST SYSTEM FOR REACTION OF AN ALLYL ALCOHOL AND CARBON TETRACHLORIDE TO PRODUCE 2,4,4,4-TETRACHLOROBUTANOL
Joel A. Zaslowsky, Woodbridge, Conn., assignor to Olin Mathieson Chemical Corporation, a corporation of Virginia
No Drawing. Filed Mar. 4, 1964, Ser. No. 349,481
10 Claims. (Cl. 260—348.6)

ABSTRACT OF THE DISCLOSURE

An improvement in the process for preparing 2,4,4,4-tetrachlorobutanol by reacting carbon tetrachloride and allyl alcohol in the presence of a catalyst, the improvement which comprises employing as the catalyst a mixture comprised of between about 2 and about 25 percent by weight of powdered iron, between about 1 and about 20 percent by weight of anhydrous ferric chloride, about 5 and about 50 percent by weight of calcium carbonate; and about 5 and about 50 percent by weight of magnesium sulfate, the proportion of the mixture being between about 5 and about 35 percent by weight of the allyl alcohol reactant. 4,4,4-trichlorobutylene oxide is prepared from the chlorinated alcohol product by heating the alcohol in an agitated aqueous lime slurry.

---

The present invention relates to a new and improved process for the preparation of 2,4,4,4-tetrachlorobutanol. More particularly, the present invention relates to novel catalysts employed in the preparation of 2,4,4,4-tetrachlorobutanol by the reaction of carbon tetrachloride and allyl alcohol.

2,4,4,4-tetrachlorobutanol is an extremely versatile compound with a wide range of utility. It reacts in a manner typical of aliphatic alcohols, and its high chlorine content renders it extremely desirable where such high chlorine content is needed, for example, as a component of pesticides in agricultural applications and the like. In addition, 2,4,4,4-tetrachlorobutanol may be readily dehydrohalogenated to yield 4,4,4-trichlorobutylene oxide, which is a reactive, high chlorine-containing epoxide useful in the preparation of epoxy resins, lubricants, polyurethane foams, and the like. 2,4,4,4-tetrachlorobutanol may also be used to prepare chlorinated terephthalate esters suitable for use in high temperature lubricants, to prepare chlorinated acrylates for use in the preparation of flame resistant acrylic resins, and for use as a plasticizer in flame resistant resins, and the like.

U.S. Patent No. 2,440,800, issued to William E. Hanford et al. on May 4, 1948, and U.S. Patent No. 2,568,859, issued to Elbert C. Ladd et al. on Sept. 25, 1951, both disclose processes in which a polymerizable aliphatic monoolefinic hydrocarbon such as ethylene is reacted with carbon tetrachloride in the presence of a free radical providing promoter such as benzoyl peroxide, ultraviolet light, and the like. While such a process is satisfactory in the reaction of hydrocarbons such as ethylene, these promoters are unsatisfactory in the reaction of olefinic alcohols such as allyl alcohol with carbon tetrachloride. In fact, substantially no conversion of the allyl alcohol to 2,4,4,4-tetrachlorobutanol is obtained when these free radical source promoters are employed. Other processes for preparing 2,4,4,4-tetrachlorobutanol from allyl alcohol are not entirely satisfactory because of the expensive reagents employed in carrying out the reaction, or because of the low yields obtained because of the ineffectiveness of the catalysts employed, or because expensive high pressure equipment or high temperatures are necessary to effect the reaction.

In Chemistry and Industry, Feb. 3, 1962, pp. 209–210, there is an article entitled "Chlorine Activation by Redox-Transfer, Addition of Carbon Tetrachloride and Chloroform to Olefins," by M. Asscher and D. Vofsi, which discloses the reaction of carbon tetrachloride and olefins such as but-2-ene in the presence of a catalyst such as copper, iron, copper chlorides, or iron chlorides in the presence of various solvents such as methanol. Although ferric chloride is alleged to be a very effective catalyst for the reaction between carbon tetrachloride and but-2-enes, such a catalyst, when employed as the sole catalyst, has substantially no effect on the reaction of carbon tetrachloride and allyl alcohol to yield 2,4,4,4-tetrachlorobutanol. A "catalyst" mixture of copper and cupric chloride likewise had substantially no effect on the reaction.

It is an object of the present invention to overcome defects presently inherent in prior art processes for the preparation of 2,4,4,4-tetrachlorobutanol from allyl alcohol and carbon tetrachloride.

Another object of the invention is to provide an improved process for preparing 2,4,4,4-tetrachlorobutanol employing a relatively inexpensive, readily available catalyst system.

A further object of the invention is to provide an improved catalyst system for the process of preparing 2,4,4,4-tetrachlorobutanol from carbon tetrachloride and allyl alcohol.

Still another object of the invention is to provide a novel process for preparing 2,4,4,4-tetrachlorobutanol from carbon tetrachloride and allyl alcohol in which the use of expensive high pressure equipment and high operating temperatures are eliminated without the formation of undesirable by-products.

These and other objects of the invention will be apparent from the following detailed description of the invention.

In accordance with the present invention, it has now been found that the foregoing objects of the present invention may be accomplished, and that 2,4,4,4-tetrachlorobutanol can be prepared in good yield, by reacting carbon tetrachloride and allyl alcohol in the presence of a catalytic proportion of a catalytic mixture comprised of powdered iron, ferric chloride, calcium carbonate and magnesium sulfate.

More in detail, carbon tetrachloride is reacted with allyl alcohol in the presence of a catalytic proportion of the catalyst mixture in a proportion equivalent to a molar ratio of carbon tetrachloride to allyl alcohol of between about 1:1 and about 6:1, preferably between about 2:1 and about 4:1. However, greater or lesser proportions may be employed if desired.

The catalyst mixture employed in carrying out the reaction is a mixture of powdered iron, ferric chloride, calcium carbonate and magnesium sulfate. The catalyst mixture is employed in any catalytic proportion that is capable of increasing the reaction rate. Typical ranges of proportions and preferred ranges of proportions of the components of the catalytic mixture which may be employed in the reaction are as follows:

| Catalyst Component | Range of Typical Proportions, Percent by weight | Range of Preferred Proportions, Percent by weight |
|---|---|---|
| Powdered iron | 2–25 | 10–20 |
| Ferric chloride | 1–20 | 5–15 |
| Calcium carbonate | 5–50 | 10–40 |
| Magnesium sulfate | 5–50 | 10–40 |

The powdered iron component of the catalytic mixture is preferably comprised of particles all of which pass a 40 mesh screen and preferably all of which pass a 100 mesh screen. Particles having a diameter larger than about plus 40 mesh may be employed but the catalytic effect of these larger particles is reduced because of the smaller surface area.

The ferric chloride component, the calcium carbonate component and the magnesium sulfate component of the catalyst system are all in anhydrous powdered form when added to the reaction.

Any type of iron can be employed as a catalyst in this process. For example, elemental iron, stainless steel, wrought iron, mixtures thereof, and the like, preferably in powdered form, may be employed as a component of the catalyst mixture.

Any convenient order of mixing of the reactants and components of the catalyst mixture may be employed. For example, all of the reactants and the components of the catalytic mixture may be added simultaneously to the reactor, the reactor contents are then agitated and heated under reflux until the reaction has attained the desired degree of completion. However, it is preferred to admix the carbon tetrachloride and allyl alcohol, both in anhydrous condition, then add anhydrous calcium carbonate powder and anhydrous magnesium sulfate powder to inhibit undesired side reactions, and follow with the addition of powdered iron and ferric chloride in that order.

After the reactants and catalytic mixture have been added to the reactor with agitation, the reaction mass is heated under reflux at a temperature in the range between about 70° and about 130° C. at autogenous pressure, and preferably between about 75° and about 90° C.

The reaction time is generally between about 5 and about 15 hours, and preferably between about 6 and about 8 hours, but shorter or longer time periods may be employed if desired.

After the refluxing step has been completed, during which time hydrogen chloride and water are formed in side reactions along with the formation of an organic phase containing 2,4,4,4-tetrachlorobutanol, the residue is cooled to substantially room temperature and solids are removed therefrom by filtration or other convenient solids-liquid separation technique. The solids are formed from unreacted catalysts or reaction products of the catalyst. The resulting filter cake is washed with carbon tetrachloride and then discarded, the carbon tetrachloride wash being added to the filtrate. The filtrate and wash solution are combined and wash with water to remove soluble salts and inactivate the catalyst. The aqueous phase is then separated from the resulting organic layer may be subjected to fractional distillation under reduced pressure to yield an initial carbon tetrachloride-allyl alcohol-water ternary azeotrope, boiling point=65.4° C., containing 5.4 percent allyl alcohol followed by the carbon tetrachloride-allyl alcohol azeotrope, boiling point=72.5° C., 8.8 weight percent allyl alcohol; carbon tetrachloride, boiling point=76.8° C., and a tetrachlorobutanol fraction at about 84° C. at 1 millimeter of mercury. The distillation residue is discharged to waste.

The process of this invention is also effective in preparing 2,4,4,4-tetrabromo- or 2,4,4,4-tetraiodobutanol from carbon tetrabromide or carbon tetraiodide, respectively.

When it is desired to prepare 4,4,4-trichlorobutylene oxide from the 2,4,4,4-tetrachlorobutyl alcohol component, the crude organic layer prepared as described above, prior to distillation, may be reacted with an aqueous $Ca(OH)_2$ slurry to yield the corresponding butylene oxide. The bromo- and iodo-substituted butylene oxides can be prepared from the corresponding alcohols in the same manner.

The following examples are presented to define the invention more fully without any intention of being limited thereby. All parts and percentages are by weight unless otherwise specified.

EXAMPLE 1

The reagents were combined in the following order with stirring in a glass-lined reactor equipped with a glass-lined reflux condenser:

Carbon tetrachloride, anhydrous. 3 moles (461.5 g.).
Allyl alcohol, anhydrous _ 1 mole (58.5 g.).
Calcium carbonate, anhydrous powder. } 1% of each based on total weight of above reagents.
Magnesium sulfate, anhydrous powder.
Iron, powdered, 100 mesh, electrolytic grade. 0.5% based on total weight of reagents.
Ferric chloride, anhydrous technical grade. 0.25% based on total weight of reagents.

With vigorous and thorough agitation, the mixture was refluxed for 7 hours. Initially the refluxing occurred when the reactoin mixture boiled at 72.5° C. (B.P. of azeotrope of carbon tetrachloride and allyl alcohol). At the end of 7 hours, the temperature was about 83° C. Both hydrogen chloride and water were formed in side reactions.

The batch was cooled to 25° C. and the solids removed by filtration. Solids were calcium and magnesium carbonates and sulfates, iron, and hydrated iron salts (12–13 grams per mole of allyl alcohol charged). The filter cake was washed with carbon tetrachloride and discarded.

The filtrate was combined with the washings and returned to the reactor, and washed with 25 percent by volume of water (100 ml.) to destroy the catalyst and to wash out soluble salts.

The organic layer was separated and without drying, was fractionally distilled under reduced pressure, maintaining the pot temperature below 100° C. to prevent decomposition of the tetrachlorobutanol. Boiling points of the components were about as follows:

| | B.P. | Moles | Grams |
|---|---|---|---|
| Water-carbon tetrachloride-allyl alcohol. | 65.4° C./760 mm | | |
| Carbon tetrachloride-allyl alcohol. | 72.5° C./760 mm | | |
| Carbon tetrachloride | 76.8° C./760 mm | 2,175 | 334.6 |
| Tetrachlorobutanol | 84° C./1 mm | 0.700 | 148.3 |
| High boilers (telomers) present up to 10%. | | | 15 |

The still residue was discharged to waste.

Yield of 2,4,4,4-tetrachlorobutanol was about 70.5 percent based on 96 percent conversion of allyl alcohol. Carbon tetrachloride consumption was 0.825 mole for 3 moles charged.

EXAMPLE 2

The procedure of Example 1 was repeated with the exception that the organic layer was not subjected to fractional distillation. Instead the organic layer was treated as follows:

A stirred aqueous slurry of lime was prepared consisting of 0.77 mole (57 g.) of $Ca(OH)_2$ in 576 g. of water. The temperature of this slurry was raised to the boiling point and dry steam passed in at atmospheric pressure with stirring. The organic layer (approximately 30 percent of 2,4,4,4-tetrachlorobutanol) was introduced below the surface of the agitated lime slurry at a rate such that the organic feed rate did not exceed the condensate collection rate by more than 20 volume percent. The ensuing reaction was endothermic, so continuous steaming was necessary to complete both the dehydrohalogenation and the distillation. When all the organic layer was added, the distillation was continued until no more organic was present in the distillate. The residual lime slurry was discarded to waste.

The distillate was separated, the organic layer was charged to a still and the water layer was sewered. The organic layer had the following approximate composition:

| | Percent |
|---|---|
| Carbon tetrachloride | 71.5–73.0 |
| Tetrachlorobutyl alcohol | 0.5–1.0 |
| Trichlorobutylene oxide | 25.0–26.5 |
| Dichlorobutylene epoxide | 0.5–1.0 |
| Four unknown by-products [1] (max.) | 1.0 |

After stripping off the carbon tetrachloride, a reduced pressure fractional distillation (20 mm.) was used to recover the product. Boiling points of the material separated were as follows:

| | |
|---|---|
| Dichlorobutylene epoxide °C./20 mm | 56–60 |
| Trichlorobutylene oxide °C./20 mm | 77–78 |
| Tetrachlorobutyl alcohol °C./1 mm | 84 |

The yield of trichlorobutylene oxide was 85 percent based upon tetrachlorobutyl alcohol.

Various modifications of the invention may be employed, some of which have been referred to above, without departing from the spirit or scope of the invention. What is desired to be secured by Letters Patent is:

1. In the process for preparing 2,4,4,4-tetrachlorobutanol by reacting carbon tetrachloride and allyl alcohol, in a liquid phase, the improvement which comprises employing in the reaction a catalytic proportion of a mixture consisting essentially of powdered iron, anhydrous ferric chloride, anhydrous calcium carbonate, and anhydrous magnesium sulfate, the temperature of the liquid phase of the reaction being maintained in the range between about 70 and 130° C., and the reaction being carried out at autogenous pressure.

2. The process of claim 1 wherein the proportion of said mixture is between about 5 and about 35 percent by weight of said allyl alcohol employed as a reactant, and said mixture is comprised of between about 2 and about 25 percent by weight of powdered iron, between about 1 and about 20 percent by weight of anhydrous ferric chloride, between about 5 and about 50 percent by weight of calcium carbonate, and between about 5 and about 50 percent by weight of magnesium sulfate in said catalyst mixture.

3. The process of claim 1 wherein the proportion of said mixture is between about 20 and about 30 percent by weight of said allyl alcohol employed as a reactant, and said mixture is comprised of between about 10 and about 20 percent by weight of powdered iron, between about 5 and about 15 percent by weight of anhydrous ferric chloride, between about 10 and about 40 percent by weight of calcium carbonate, and between about 10 and about 40 percent by weight of magnesium sulfate in said catalyst mixture.

4. In the process for preparing 2,4,4,4-tetrachlorobutanol by reacting carbon tetrachloride and allyl alcohol, the improvement which comprises employing a catalytic proportion of a mixture consisting essentially of powdered iron, anhydrous ferric chloride, anhydrous calcium carbonate, and anhydrous magnesium sulfate, the molar ratio of carbon tetrachloride to allyl alcohol being in the range between about 1:1 and about 6:1, the proportion of said mixture being between about 5 and about 35 percent by weight of said allyl alcohol employed as a reactant, said mixture being comprised of between about 2 and about 25 percent by weight of powdered iron, between about 1 and about 20 percent by weight of anhydrous ferric chloride, between about 5 and about 50 percent by weight of calcium carbonate, and between about 5 and about 50 percent by weight of magnesium sulfate, the temperature being maintained in the range between about 70° and about 130° C., and the reaction being carried out at autogenous pressure.

5. In the process for preparing 2,4,4,4-tetrachlorobutanol by reacting carbon tetrachloride and allyl alcohol, the improvement which comprises employing a catalytic proportion of a mixture consisting essentially of powdered iron, anhydrous ferric chloride, anhydrous calcium carbonate, and anhydrous magnesium sulfate, the molar ratio of carbon tetrachloride to allyl alcohol being in the range between about 2:1 and about 4:1, the proportion of said mixture being between about 20 and about 30 percent by weight of said allyl alcohol employed as a reactant, said mixture being comprised of between about 10 and about 20 percent by weight of powdered iron, between about 5 and about 15 percent by weight of anhydrous ferric chloride, between about 10 and about 40 percent by weight of calcium carbonate, and between about 10 and about 40 percent by weight of magnesium sulfate, the temperature being maintained in the range between about 75° and about 90° C., and the reaction being carried out at autogenous pressure.

6. The process for preparing 4,4,4-trichlorobutylene oxide which comprises reacting carbon tetrachloride with allyl alcohol in the presence of a catalytic proportion of a catalyst mixture consisting essentially of powdered iron, anhydrous ferric chloride, anhydrous calcium carbonate, and anhydrous magnesium sulfate, heating the resulting reaction mass to a temperature in the range between about 70 and about 130° C. at reflux until the desired degree of conversion to 2,4,4,4-tetrachlorobutanol is attained, separating solid catalyst and solid reaction products from the resulting reaction mass to yield a liquid phase containing 2,4,4,4-tetrachlorobutanol, admixing said liquid phase with water, separating the resulting aqueous phase from the resulting first organic phase containing 2,4,4,4-tetrachlorobutanol dissolved therein, adding said first organic phase with agitation to an aqueous lime slurry heated to above the boiling point while passing continuously a stream of steam through the resulting slurry to yield a distillate, condensing said distillate, and recovering therefrom a second organic phase containing 4,4,4-trichlorobutylene oxide dissolved therein.

7. The process of claim 6 wherein the proportion of said mixture is between about 5 and about 35 percent by weight of said allyl alcohol employed as a reactant, and said mixture is comprised of between about 2 and about 25 percent by weight of powdered iron, between about 1 and about 20 percent by weight of anhydrous ferric chloride, between about 5 and about 50 percent by weight of calcium carbonate, and between about 5 and about 50 percent by weight of magnesium sulfate in said catalyst mixture.

8. The process of claim 6 wherein the proportion of said mixture is between about 20 and about 30 percent by weight of said allyl alcohol employed as a reactant, and said mixture is comprised of between about 10 and about 20 percent by weight of powdered iron, between about 5 and about 15 percent by weight of anhydrous ferric chloride, between about 10 and about 40 percent by weight of calcium carbonate, and between about 10 and about 40 percent by weight of magnesium sulfate in said catalyst mixture.

9. The process of claim 6 wherein the molar ratio of carbon tetrachloride to allyl alcohol is in the range between about 1:1 and about 6:1, the proportion of said mixture is between about 5 and about 35 percent by weight of said allyl alcohol employed as a reactant, said mixture is comprised of between about 2 and about 25 percent by weight of powdered iron, between about 1 and about 20 percent by weight of anhydrous ferric chloride, between about 5 and about 50 percent by weight of anhydrous calcium carbonate, and between about 5 and about 50 percent by weight of anhydrous magnesium sulfate.

10. The process of claim 6 wherein the molar ratio of carbon tetrachloride to allyl alcohol is in the range between about 2:1 and about 4:1, the proportion of said mixture is between about 20 and about 30 percent by weight of said allyl alcohol employed as a reactant, said mixture is comprised of between about 10 and about 20 percent by weight of powdered iron, between about 5 and about 15 percent by weight of anhydrous ferric chloride, between about 10 and about 40 percent by weight of calcium carbonate, and between about 10 and about 40 percent by weight of magnesium sulfate, and the temperature is maintained in the range between about 75° C. and about 90° C.

References Cited

UNITED STATES PATENTS

| | | | |
|---|---|---|---|
| 1,446,874 | 2/1923 | Brooks | 260—633 |
| 2,311,023 | 2/1943 | Brooks | 260—633 |
| 2,401,099 | 5/1946 | Peterson | 260—654 |
| 2,568,859 | 9/1951 | Ladd et al. | 260—658 |
| 3,054,739 | 9/1962 | Reicheneder et al. | 260—633 X |

FOREIGN PATENTS

| | | |
|---|---|---|
| 123,885 | 5/1944 | Australia. |
| 1,334,749 | 7/1963 | France. |
| 244,066 | 3/1963 | Australia. |
| 527,462 | 7/1956 | Canada. |

OTHER REFERENCES

Asscher et al., J. Chem Soc., March 1963, pp. 1887–1896.

Vogel, Practical Organic Chemistry, John Wiley & Sons, New York, 1957, p. 140.

LEON ZITVER, *Primary Examiner.*

H. MARS, N. J. KING, *Assistant Examiners.*